United States Patent [19]

Naud

[11] Patent Number: 4,683,717
[45] Date of Patent: Aug. 4, 1987

[54] STRUCTURAL COWLINGS OF TWIN FLOW TURBO JET ENGINES

[75] Inventor: Henry Naud, Verrieres Le Buisson, France

[73] Assignee: Societe Nationale D'Etude et de Construction de Moteur D'Aviation "S.N.E.C.M.A.", Paris, France

[21] Appl. No.: 703,439

[22] Filed: Feb. 20, 1985

[30] Foreign Application Priority Data

Mar. 7, 1984 [FR] France ................. 84 03509

[51] Int. Cl.⁴ .............................................. F02K 3/02
[52] U.S. Cl. .................................. 60/226.1; 60/226.2; 60/39.31; 60/39.32
[58] Field of Search .................. 60/226.1, 226.2, 262, 60/39.31, 39.32

[56] References Cited

U.S. PATENT DOCUMENTS

| 3,541,794 | 11/1970 | Johnston et al. | 60/39.31 |
| 3,750,983 | 8/1973 | Morris | 60/226.1 |
| 4,037,809 | 7/1977 | Legrand | 60/226.1 |
| 4,055,041 | 10/1977 | Adamson et al. | 60/226.1 |
| 4,361,296 | 11/1982 | Hall | 244/54 |
| 4,384,453 | 5/1983 | Tudor et al. | 60/39.31 |
| 4,442,987 | 4/1984 | Legrand et al. | 60/226.2 |
| 4,471,609 | 9/1984 | Porter et al. | 60/39.31 |
| 4,502,276 | 3/1985 | Pask | 60/39.32 |

FOREIGN PATENT DOCUMENTS

| 875843 | 7/1971 | Canada | 60/226.1 |
| 1930959 | 9/1977 | Fed. Rep. of Germany | 60/39.31 |
| 2295876 | 7/1976 | France . | |
| 2337258 | 7/1977 | France | 60/226.2 |
| 2496766 | 2/1983 | France . | |
| 1455603 | 11/1976 | United Kingdom | 60/39.31 |
| 2061389 | 5/1981 | United Kingdom . | |

Primary Examiner—Louis J. Casaregola
Assistant Examiner—Donald E. Stout
Attorney, Agent, or Firm—Oblon, Fisher, Spivak, McClelland & Maier

[57] ABSTRACT

A twin flow turbo-jet engine which includes an inner structural cowling formed by two lateral shells and which is secured through the intermediary of a securing mechanism such as fluid actuators between a forward flange and a rear flange of the casing of the engine. At least one of the securing devices enables free thermal expansion of the casing. The upstream edge of the inner cowling may include an annular seat which is in sliding abutment on the outer surface of one cylindrical annular member carried by one flange of the engine casing. The downstream edge of the cowling is connected by an annular tooth-groove connection with a support ring of which the securing to the casing is provided by a system of radial pins and ball joints.

12 Claims, 19 Drawing Figures

STRUCTURAL COWLINGS OF TWIN FLOW TURBO JET ENGINES

BACKGROUND OF THE INVENTION

1. Field of the Invention

The invention relates to twin flow turbo jet engines.

2. Summary of the Prior Art

The increase in the cost of fuel has encouraged engine manufacturers to improve the efficiency of engines and with this in mind to eliminate defects which hitherto appeared to be of secondary importance.

Their attention has thus been drawn to small deformations arising in the primary zone of the engine and resulting from loadings which cause flexing. These flexing movements can result in an increase in the clearance at the blade tips and thereby reduction in the efficiency of the engine.

As a result of the shape of the engine in the form of a wasp's body, the only reinforcement of the casing had no other result than an increase in the weight, without leading to the anticipated result. One solution of this problem was described in the article "Structural load carrying engine cowls" by K. W. Porter appearing at pages 54 and 55 of the October 1981 issue of the Journal "Astronautics and Aeronautics". The engine casing surrounding the engine is supported at the front in an annular member secured to the fan casing and at the rear within an annular support. The annular support and the ring are directly or indirectly supported by the strut or pylon of the associated aircraft.

The structural cowling is formed by two semi-cylindrical half-cowlings comprising radial limbs and longitudinal cross members.

The forward edges of the half-cowling are provided with a radial tongue of V section, directed towards the centre. The forward annular member has an annular groove of complementary profile to that of the tongue.

The rear edges of the half-cowling have a profile provided for adaption to the periphery of the rear annular support. The half-cowlings are pivoted at their upper longitudinal edges to a plate of the structure and are connected by hydraulic actuators which enable, when locking means, disposed on the lower longitudinal edges of the half-cowlings, are closed, to apply a tension force on the two half-cowlings and to ensure a positive locking on the forward and rear securing means. A cowling of high rigidity is thus provided which accommodates the forces to which the casing is subjected.

Although the structural cowling such as has been described has enabled a substantial reduction in the mechanical deformation of the casing, it is not the same for the deformation resultant from temperature changes. In practice, the temperatures longitudinally of the casing are very different from those taken up by the cowling and, as a result of the longitudinal flanging of the casing, the longitudinal deformation although of small amplitude nevertheless produces substantial forces which limit the efficacy of the cowling assembly.

The invention has as its object a structural cowling of a type similar to that hereinbefore described but comprising means for overcoming disadvantages resulting from thermal expansion of the engine, whilst ensuring aerodynamic continuity of the flow and fluidtightness while at the same time permitting ready access to the engine thus equipped and responsive to the stresses of a thrust reverser of the fan.

SUMMARY OF THE INVENTION

According to the present invention there is provided in a twin-flow turbo-jet engine, a casing having upstream flange means, and downstream flange means inner structural cowling means in the form of two half-shells defining a path for one flow, outer cowling means defining a path for the other flow, means mounting the half-shells to the said upstream and downstream flanges of the casing, and at least one securing assembly interconnecting the inner structural cowling means and one of the casing flange means, the securing means enabling free thermal expansion of the casing relative to the inner structural cowling.

According to a first embodiment of the invention, the securing assembly comprises slide means permitting free differential longitudinal expansion between the casing and the cowling.

According to a second embodiment, the securing assembly comprises a connecting means of the casing constituted by a device with at least three regularly spaced connecting pins, one end of the pins being secured in a support of the engine casing, the other end cooperating with the bore of a spherical body held in a fixed bearing on the engine casing.

DESCRIPTION OF THE PREFERRED EMBODIMENTS

Figure 1:
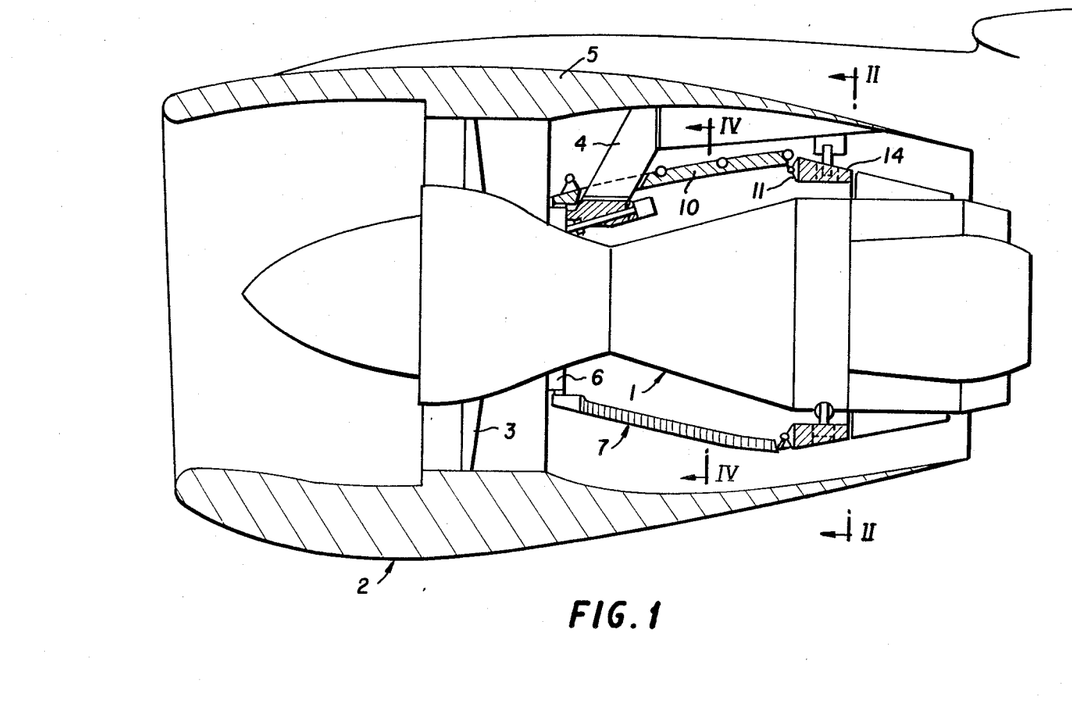
FIG. 1 is a diagrammatic view in vertical section of an engine located in a nacelle and comprising one embodiment of a structural cowling in accordance with the invention.

FIG. 1 illustrates in diagrammatic section a turbo jet engine with twin, separate, flows and mounted in a nacelle beneath the wings of an aircraft. The engine, mounted within its casing 1, is extended forwardly by a fan 2 of which the casing is secured to the engine casing, in known manner by cross members 3.

Figure 3:
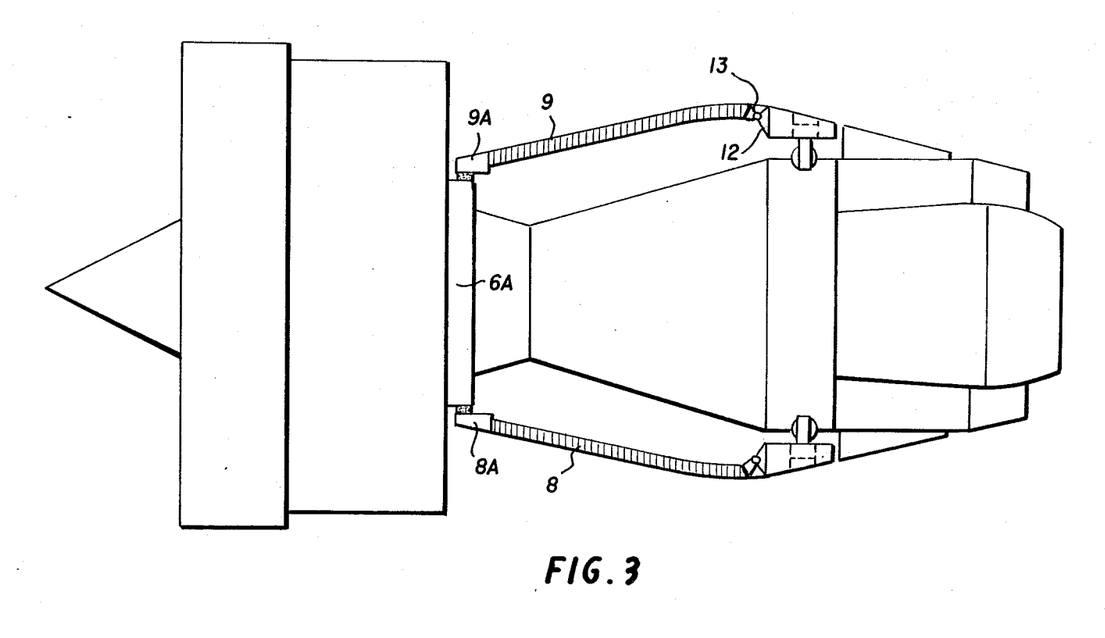
FIG. 3 is a section on line III—III of FIG. 2.
Figure 4:
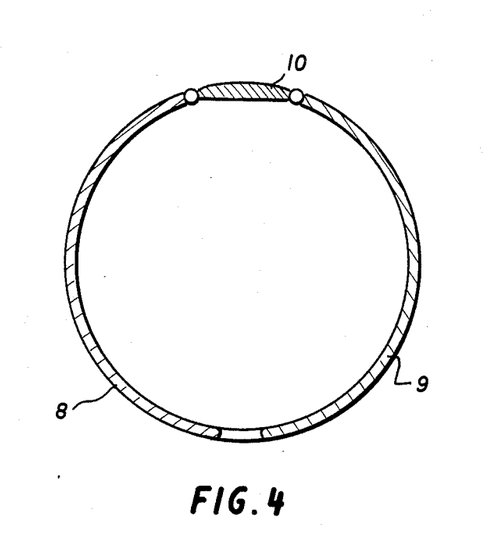
FIG. 4 is a cross section on the line IV—IV of FIG. 1.

The engine is suspended from the strut or pylon 4 by known devices such as bolts, or other securing means which will be described in detail hereinafter. The casing of the fan carries an external fairing 5 extending rearwardly over at least a part of the engine casing. This fairing defines a passage for the flow of dilution air derived from the fan. In accordance with the embodiment illustrated, the external fairing is traversed at least partially by the strut 4. In order to ensure suitable aerodynamic passage for the flow of dilution air, it is provided with a cowling 7 between the forward mounting flange 6 of the engine and the intake of the nozzle. The cowling covers the part of the engine approximately corresponding to the high-pressure compressor, to the combustion chambers, to the turbine and to the inlet section to the nozzle. In order to reduce deformations of this central zone of the engine, the cowling 7 is reinforced so as to assist in providing rigidity for the engine casing. In known manner, the cowling is formed by two half-shells 8,9 which are approximately semi-cylindrical and are internally reinforced by radially and longitudinally-extending members (FIGS. 3,4). In the embodiment illustrated, the half-shells 8 and 9 are pivoted to an upper plate 10 at their longitudinal edges. The plate 10 is subject to tensile forces. This plate is traversed by suspension means of the engine constituted by a part of the strut 4. The longitudinal internal edges carry locks enabling their securement. Hydraulic actuators (not shown) provide for opening of the cowling in case of need for attention to the engine, and mounting of the shells against the foward and rear mounting flanges 6,11 provided on the engine casing. This mounting enables transmission of forces in the engine casing to the rigid assembly constituted by the half-shells 8 and 9 forming the internal cowling 7.

According to one embodiment of the invention, the forward mounting flange 6 comprises an annular member 6A on which are mounted radially internal cylindrical seats 8A and 9A at the upstream edges of the shells 8 and 9. The rear mounting flange 11 comprises at its circumference a triangular section groove 12 in which is radially secured and axially locked a radial tooth 13 provided at the rear end of the internal face of the shells. The plate 10 is itself floating and in abutment respectively upstream and downstream on the annular member 6A and the flange 11.

As a result of the mounting of one end by cylindrical seats enabling axial displacement, the engine casing is capable of axially expanding without being subjected to substantial stresses and, as a result, deformations.

Figure 2:
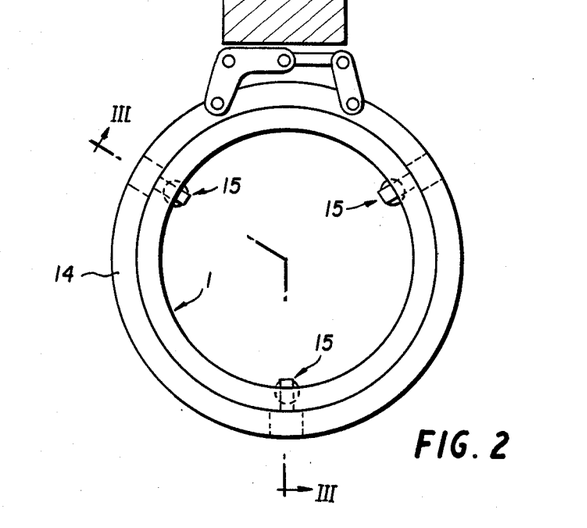
FIG. 2 is a section on the line II—II of FIG. 1.

In order to facilitate thermal expansion of the engine, in the area of the exhaust part of the casing on which the rear flange is mounted, the latter takes the form of a ring 14 connected with the casing by three radial connecting pins 15 which are angularly distributed; in the embodiment illustrated they are disposed at 120° as shown in FIG. 2.

The ring 14 is connected, in known mnaner, to the strut or pylon 4 by a system of links as illustrated in FIG. 2 for the suspension of the rear part of the engine.

Figure 5:
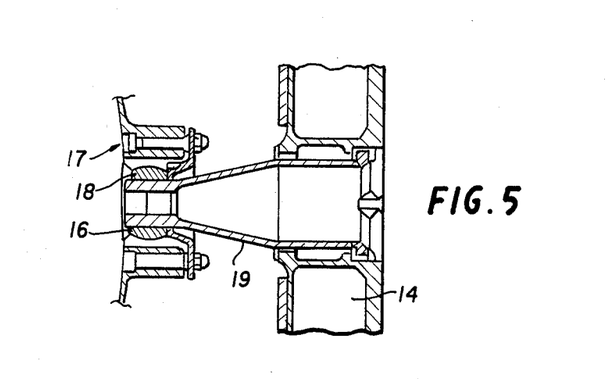
FIG. 5 is a section of one pin assembly connecting the engine casing to the securing ring.

According to one embodiment, the radial pin assembly (FIG. 5) comprises a ball joint 16 of which the bearing 17 is secured to the casing. The spherical body 18 is mounted on one end portion of the pin 19. The other end portion is secured to the ring support 14. The end portion of the pin cooperating with the spherical body is, possibly, made capable of sliding in a bore of the spherical body.

Figure 6:
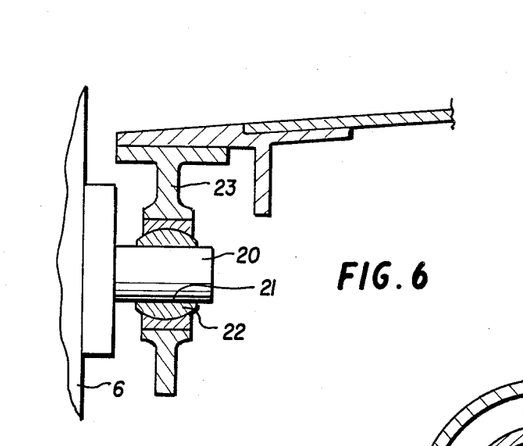
FIG. 6 is a section of one embodiment of a sliding mounting device of the casing.

According to another construction enabling forward connection of the cowling, axial pin assemblies are provided (FIG. 6). The upstream or forward flange 6 is provided with axial pins 20 which are able to slide in a cylindrical bore 21 provided in the spherical body 22 of a ball joint mounted in a housing 23. This form of coupling enables positive securing of the cowling in the housing, for example, by bolts, a U-shaped collar, or by means of a flange with rapid disassembly capability. Each opening of the cowling thus does not give rise to the risk of deforming the sliding part or upsetting the sliding conditions.

Figure 8A:
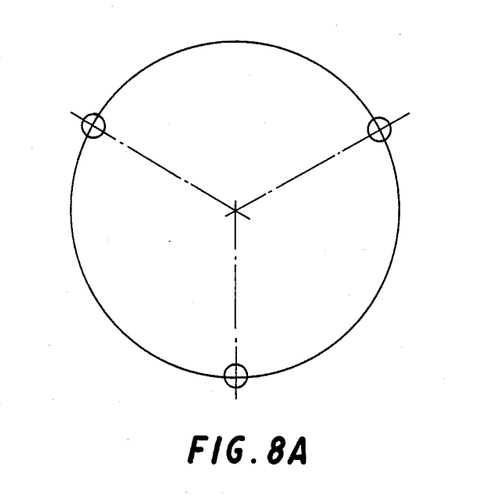
FIGS. 8A and 8B show relative positions of the radial pin assemblies of FIG. 5 and of axial pins.
Figure 8B:
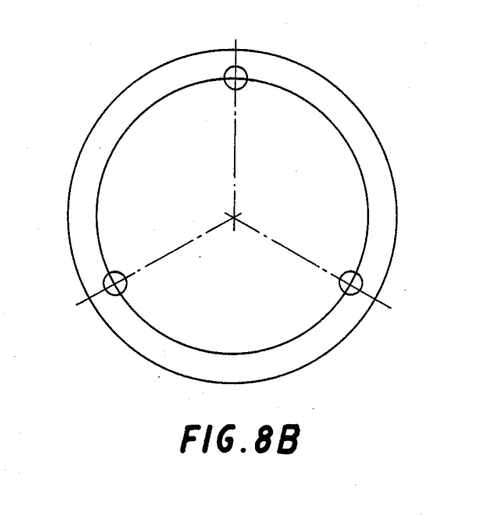

If two pin assemblies are to be provided, upstream axial pin assemblies and radial pin assemblies downstream, it is desirable to invert the position of the upstream and downstream mounting means so that they lie diametrically opposite one another or in other words in quincunx. As illustrated in FIGS. 8A and 8B, the upstream assemblies (8A) are staggered in relation to the downstream assemblies (8B).

According to one embodiment of a mounting means accommodating both radial as well as axial expansion, a coupling (FIG. 7) is provided between the flange 6 and the edge of the cowling and takes the form of two coaxial rings 24,25 disposed one within the other and cooperating through the intermediary of grooves 26 and teeth 27 disposed on their opposed faces, peripherally matched and providing a radial clearance. The surfaces cooperating in the transmission of forces are of dimensions sufficient to reduce friction and can possibly serve for taking up play.

Figure 7:
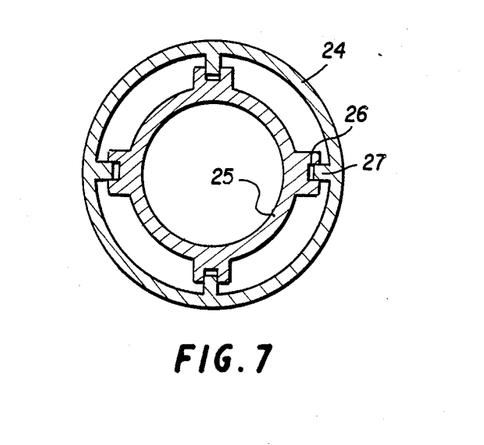
FIG. 7 is a section of a second sliding mounting device of the casing.

The example illustrated is a mounting means with four "teeth" from which it will be apparent that flexing motion in the vertical plane passes into the cowling and is transmitted upstream by two horizontal "teeth".

Such a mounting means must comprise at least three teeth, a larger number can be selected as a function of the forces to be accommodated. As the forces are higher in radial planes approaching the horizontal, it is possible to take into account not only the number but also the thickness of the horizontal "teeth" in relation to the vertical "teeth".

As in the embodiment hereinbefore described the cowling is secured on the outer ring 24 by detachable means enabling locking of the cowling on the ring 24.

As has been hereinbefore discussed, in order to facilitate access to the engine casing, the structural cowling 8,9, was provided in two parts and with means enabling raising of the shells, but the "inner" cowling is covered at least in part by the "outer" cowling 5 of the fan. The cowling is formed, at least in its rear part corresponding to the inner cowling, by two half shells 28,29 mounted at the upper parts thereof by fixed pivots 30, for example on the strut or pylon, and closed at their lower parts by bolts (not shown).

Figure 9A:
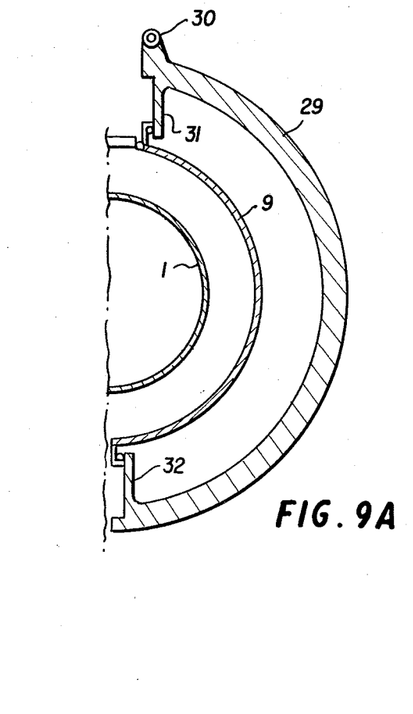
FIG. 9A is a sectional view of a fairing of the C type when closed.
Figure 9B:
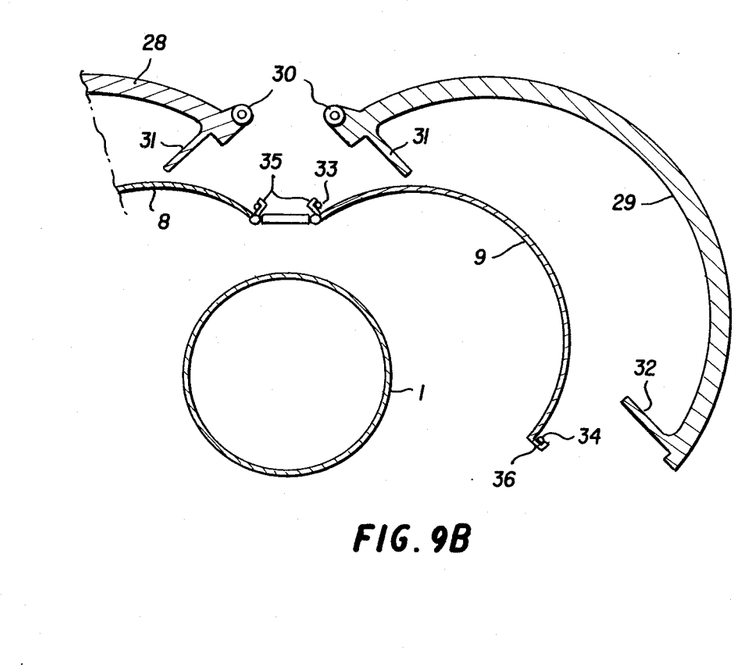
FIG. 9B is a sectional view of a fairing of the C type when open.

According to the embodiment illustrated in FIGS. 9A and 9B the half-shells 8,9 forming the inner cowling and the half-shells 28 and 29 forming the outer cowling are separately pivoted and can be opened in a similar manner. The shells of the outer cowling have on their inner surface longitudinal-extending ribs 31,32 directed inwardly, of a height sufficient to cooperate with a seal 33,34 supported by a ridge 35,36 of the shells 8,9 of the internal cowling, and ensuring fluid-tightness of the secondary flow duct. This type of cowling is termed a C type cowling. In this embodiment, the inner and outer cowlings being independent the loads to which the first cowling is subjected are not transmitted to the second cowling.

However, it may be advantageous to make the boundary means for the secondary flow on the basis of rigidly interconnected elements in order to increase resistance to pressure forces. However, if the thrust reverser system is mounted on the outer cowling, it is necessary to avoid the transmission of forces between the two cowlings. Thus, it is necessary to provide for separation of the inner from the outer element. The embodiment illustrated in FIGS. 10A and 10B meets these conditions; the shells 37 and 38 of the outer cowling carry lateral walls 39,40 extending longitudinally from one end to the other and directed inwardly, connect at their longitudinal edges by sliding seals 41,42 to the half-shells 8 and 9 of the internal cowling. These seals are similar to the guide elements described in French Patent Application published under No. 2,496,766 and illustrated in FIG. 14. These seals enable a limited rotation of each inner cowling part with respect to the corresponding wall 39,40. A degree of flexibility in the vertical sense being also necessary, a flexible connection is provided, by means of a leaf spring for example between the walls 39,40 and the slide seal. The floating plate is replaced in this embodiment by double acting hydraulic actuators 43 connected at each end to one of the inner shells. These hydraulic actuators provide for locking of the internal cowling on the flanges of the engine casing 1, and serve also for opening of the two cowlings which pivot about pivots 44 mounted on the strut or pylon 4. The closing bolts 45 disposed on the internal edges of the inner cowling also ensure that the outer cowling is held in a closed position. This type of cowling is termed a D type cowling.

Figure 11:
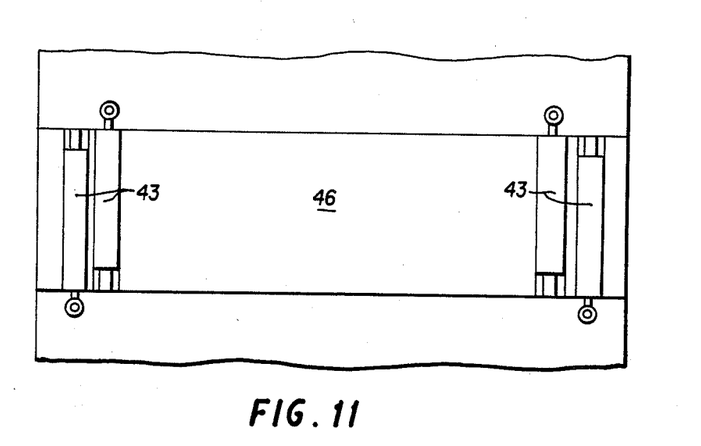
FIG. 11 is a view in plan of a support plate of hydraulic actuators.

According to the embodiment illustrated in FIG. 11, the hydraulic actuators 43 are mounted on an intermediate plate 46 at the front and at the rear thereof. Although it is desirable that these hydraulic actuators should be aligned two by two in order to permit them to act in a common plane to affect closure upstream and respectively the downstream, the problems of space may lead to an arrangement where they are juxtaposed as in FIG. 11. The plate is secured by bolting or by any other securing means to the upstream end on the casing or the flange of the casing 6 and to the rear on the support ring 14.

Figure 12A:
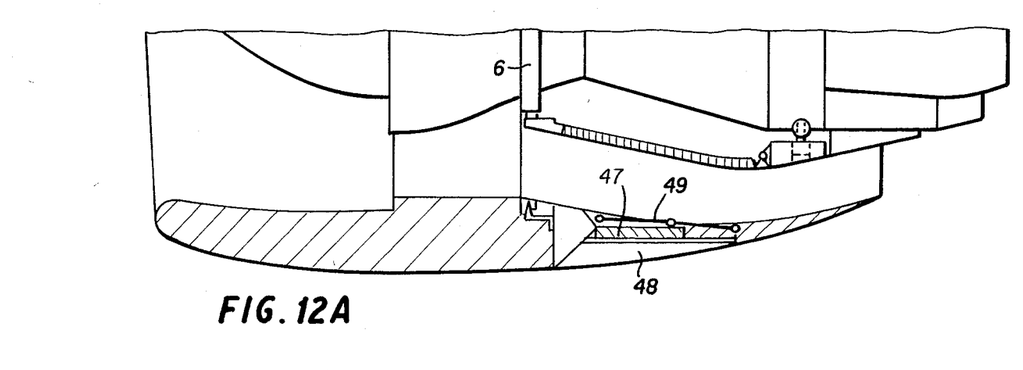
FIG. 12A is a half-section of a turbo jet engine with a flow reverser for the fan in an inactive position.
Figure 12B:
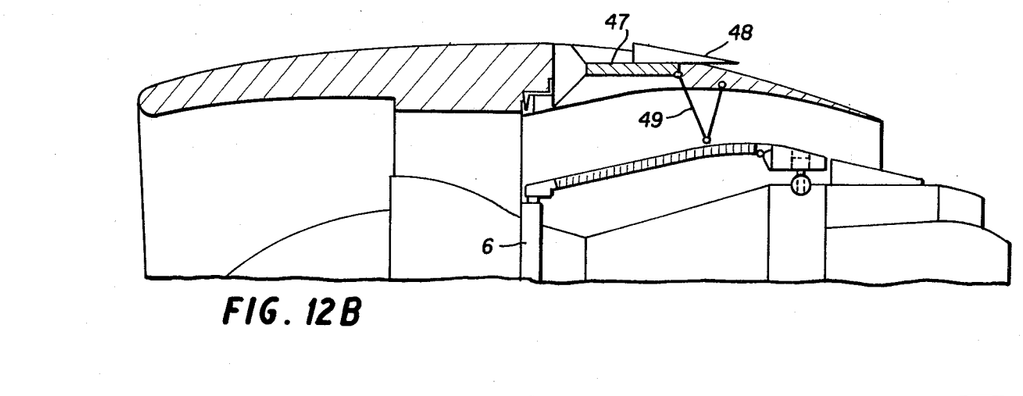
FIG. 12B is the same half-section as FIG. 12A, the reverser being in an active position.

As mentioned hereinbefore, the structural internal cowling can be adapted to an engine with a "fan" thrust reverser. FIG. 12A shows a semi section of a turbo jet engine with a thrust reverser acting on the secondary air, the reverser being inactive. FIG. 12B shows the same reverser in the active position.

The thrust reverser, provided within the cowling of the fan comprises, as known, reverser grills 47 disposed within the thickness of the nacelle, covered when it is not in use, by a movable section of the cowling. When in use, the section 48 is moved downstream in order to uncover the grills. This movement locates obturation means 49 for the secondary flow rearwardly of the grills 47 which effects flow in the upstream direction, through the grills, all the air flow being derived from the fan. The section 48 is guided during its translational movement by a guide device 50 which may be described in French Patent 2 496 533 and illustrated in FIG. 14. These devices are provided in a sufficient number to enable the translation and the fixing of the movable section 48.

Figure 10A:
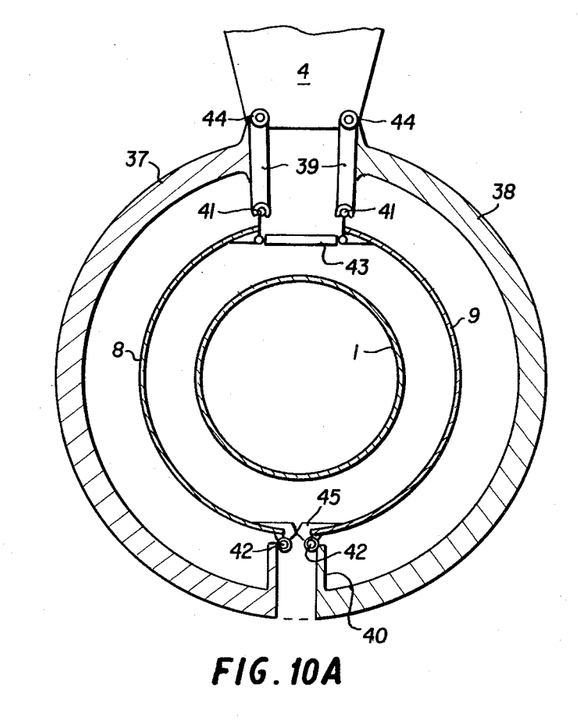
FIG. 10A is a radial section of a fairing of the D type when closed.
Figure 10B:
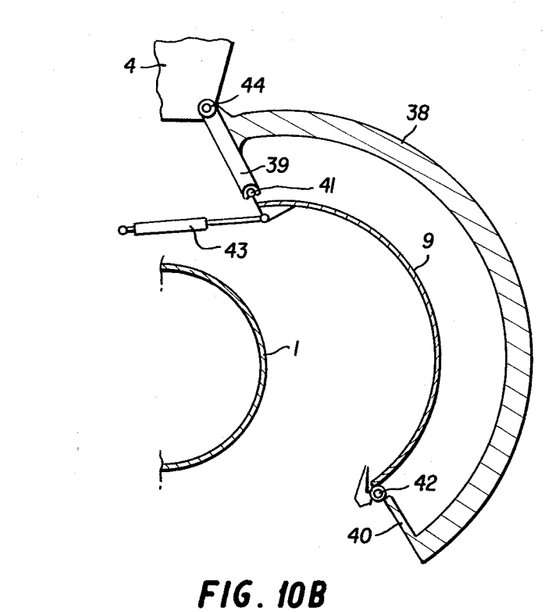
FIG. 10B is a view in radial section of a fairing of the D type when open.
Figure 13A:
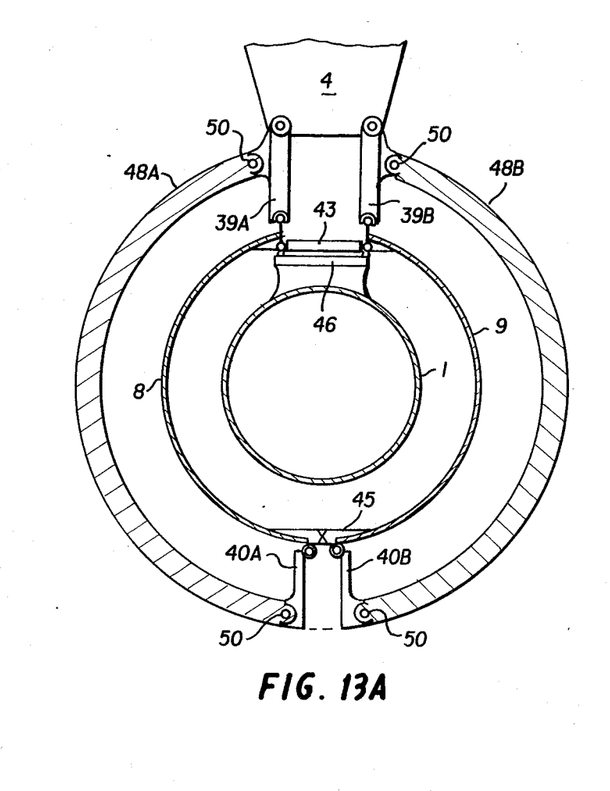
FIG. 13A is a radial section of a cowling, when closed, of an engine with a thrust reverser in the "active" and and "inactive" positions.
Figure 13B:
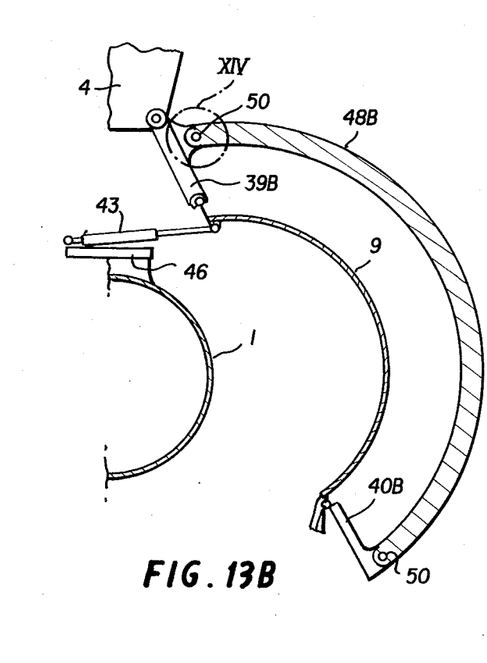
FIG. 13B is a radial half-section of cowling, when open, of the jet engine with thrust reverser.

FIGS. 13A and 13B illustrate a cowling of D type similar to that of FIGS. 10A and 10B but with the provision of the intermediate plate (FIG. 11), and also illustrating the thrust reverser.

The guide devices 50 are disposed between the lateral walls 39A,39B,40A,40B and the sections 48A,48B of the half shells 37,38. These devices comprise (FIG. 14) a guide rail 51 having a cylindrical section groove, the rail being secured on a frame element 52 extending the internal wall 39 or 41. A tubular, cylindrical-section, body 53 slides in the groove on a generating line of a flange 54 of which the end is secured to the lateral edge of the section 48 of the cowling. A coating 55, of a material having good sliding characteristics and resistance to wear, is interposed between the rail and the tubular cylindrical body 53.

Figure 14:
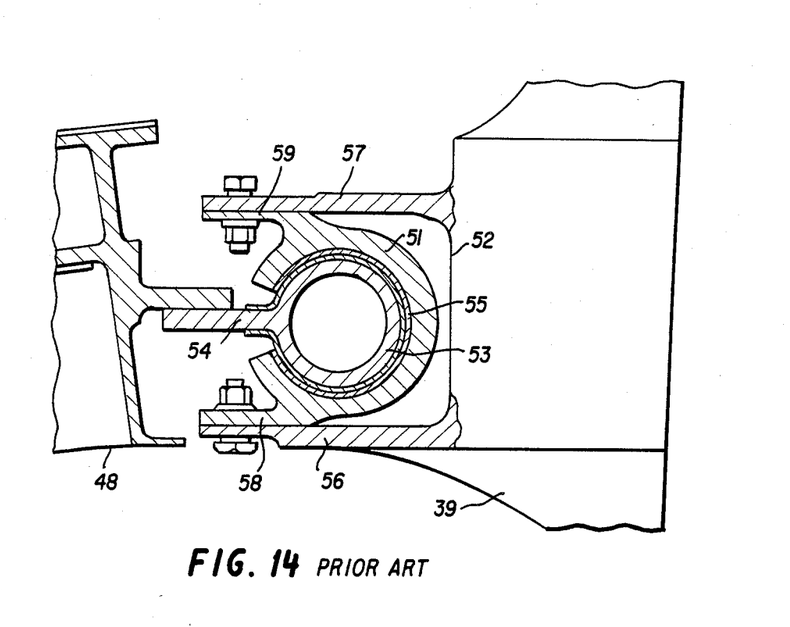
FIG. 14 is a section to an enlarged scale of the detail XIV of FIG. 13B.

According to the embodiment illustrated in FIG. 14, the frame member 52 incorporates two lateral flanges 56,57 forming a U section groove in which is secured, by two parallel flanges 58,59 the guide rail 51.

The movable section 48 is formed at the outer cowling of two half-shells 48A and 48B which are mounted on the upper transverse walls 39A,39B and lower transverse walls 40A,40B by the guide devices 50. When the movable section 48 covers the grills 47, the cowling can be opened out under the action of the hydraulic actuators 43, secured on the plate support 46, located between the front flange and the rear ring of the engine casing 1, and acting on the internal structural cowling 8,9. The lower edges of the two cowling parts 8,9 carry, as hereinbefore described, the bolts 45 providing the required connection.

In an unillustrated modification the longitudinal slide means can be disposed downstream rather than upstream; conversely the radial pin assemblies can be mounted at the upstream end of the engine.

What is claimed is:

1. In a twin-flow turbo-jet engine,
a casing comprising a compressor, a combustor and a turbine, defining a path for a first flow and having upstream flange means, and downstream flange means;
inner structural cowling means in the form of two half-shells;
outer cowling means wherein said inner and outer cowling means define between them a path for a second flow downstream of a fan;
means for mounting the half-shells to said upstream and downstream flanges of the casing; and
at least one securing assembly interconnecting the inner structural cowling means and one of the casing flange means, said securing assembly comprising means for enabling free thermal expansion of the casing relative to the inner structural cowling wherein the securing assembly includes slide means enabling free differential longitudinal expansion between the casing and the inner cowling means and wherein the securing assembly further comprises at least three, regularly spaced, axial pin assemblies, each pin assembly comprising:
a first element in the form of a pin, and
a second element in the form of a spherical body with a central bore,
an end portion of the pin engaging in the bore of the spherical body,
means for securing one said element to the engine casing, and
housing means accommodating the spherical body, the housing means being connected to one of the half-shells of the inner cowling means.

2. In a twin-flow turbo-jet engine,
a casing comprising a compressor, a combustor and a turbine, defining a path for a first flow and having upstream flange means, and downstream flange means;
inner structural cowling means in the form of two half-shells;
outer cowling means wherein said inner and outer cowling means define between them a path for a second flow downstream of a fan;
means for mounting the half-shells to said upstream and downstream flange of the casing; and
at least one secureing assembly interconnecting the inner structural cowling means and one of the casing flange means, the securing assembly comprising means for enabling free thermal expansion of the casing relative to the inner structural cowling wherein the securing means further comprises:
at least three, regularly-spaced, radiallyextending pins, and
a corresponding number of spherical bodies each with a bore therein,
a support ring of the engine casing, and seating means rigid with the engine casing,
each pin being mounted at one end portion to the support ring and the other end portion being engaged in the bore of the spherical body.

3. An engine according to claim 2 wherein said securing means further comprises first and second securing assemblies, said first securing assembly being located upstream and the second securing assembly being located downstream of the engine, wherein said upstream assembly further comprises slide means for enabling free differential longitudinal expansion between the casing and the cowling means and wherein said downstream assembly further comprises said radial pins and spherical bodies.

4. An engine according to claim 3 wherein the slide means of the upstream assembly further comprises axially-extending pins and wherein the radial pins of the downstream assembly which are arranged in quincunx in relation to the axial pins of the upstream assembly.

5. In a twin-flow turbo-jet engine,
a casing comprising a compressor, a combustor and a turbine, defining a path for a first flow and having upstream flange means, and downstream flange means;
inner structural cowling means in the form of two half-shells;
outer cowling means wherein said inner and outer cowling means define between them a path for a second flow downstream of a fan;
means for mounting the half-shells to said upstream and downstream flanges of the casing;
at least one securing assembly interconnecting the inner structural cowling means and one of the casing flange means, said securing assembly comprising means for enabling free thermal expansion of the casing relative to the inner structural cowling
means defining an annular groove at the downstream edge of the half-shells of the inner cowling,
means defining an annular tooth engaged in said groove,
a support ring operatively associated with the groove and tooth defining means, and
a plurality of radial pin assemblies mounting the support ring to the engine casing.

6. In a twin-flow turbo-jet engine,
a casing comprising a compressor, a combustor and a turbine, defining a path for a first flow and having upstream flange means, and downstream flange means;
inner structural cowling means in the form of two half-shells;
outer cowling means wherein said inner and outer cowling means define between them a path for a second flow downstream of a fan;
means for mounting the half-shells to said upstream and downstream flanges of the casing; and
at least one securing assembly interconnecting the inner structural cowling means and one of the casing flange means, said securing assembly comprising means for enabling free thermal expansion of the casing relative to the inner structural cowling and pivot means and a plate extending in a floating manner between the upstream and downstream flange means, the half-shells being pivoted by the pivot means at a respective one of their longitudinal edges to the said floating plate.

7. An engine according to claim 6 wherein the floating plate further comprises an opening for the passage of the upstream securing assembly to support structure of an associated aircraft.

8. In a twin-flow turbo-jet engine,
a casing comprising a compressor, a combustor and a turbine, defining a path for a first flow and having upstream flange means, and downstream flange means;
inner structural cowling means in the form of two half-shells;
outer cowling means wherein said inner and outer cowling means define between them a path for a second flow downstream of a fan;
means for mounting the half-shells to said upstream and downstream flanges of the casing; and
at least one securing assembly interconnecting the inner structural cowling means and one of the casing flange means, said securing assembly comprising means for enabling free thermal expansion of the casing relative to the inner structural cowling wherein said outer cowling means comprises two further half-shells, and pivot means for pivoting the further half-shells to support structure of the engine.

9. In a twin-flow turbo-jet engine,
a casing comprising a compressor, a combustor and a turbine, defining a path for a first flow and having upstream flange means, and downstream flange means;
inner structural cowling means in the form of two half-shells;
outer cowling means wherein said inner and outer cowling means define between them a path for a second flow downstream of a fan;

means for mounting the half-shells to said upstream and downstream flanges of the casing; and at least one securing asesmbly interconnecting the inner structural cowling means and one of the casing flange means, said securing assembly comprising means for enabling free thermal expansion of the casing relative to the inner structural cowling wherein said outer cowling means comprises two further half-shells, and flexible connecting means interconnecting the half-shells and further half-shells, the arrangement being such that the connecting means minimizes the load transfer between the inner and outer cowlings.

10. An engine according to claim 9 wherein the flexible connecting means further comprise a sliding seal assembly each incorporating an elongate hollow cylindrical member rigid with a said further half-shell and a tubular element rotataly engaged within the hollow cylindrical member and rigid with a corresponding one of the said half-shells.

11. An engine according to claim 9 wherein the flexible connecting means comprise flexible elements vertically extending between each inner and corresponding outer shell.

12. An engine according to claim 9 further comprising fluid actuators serving to open and close the cowlings for maintenance and inspection.

* * * * *